2,617,673

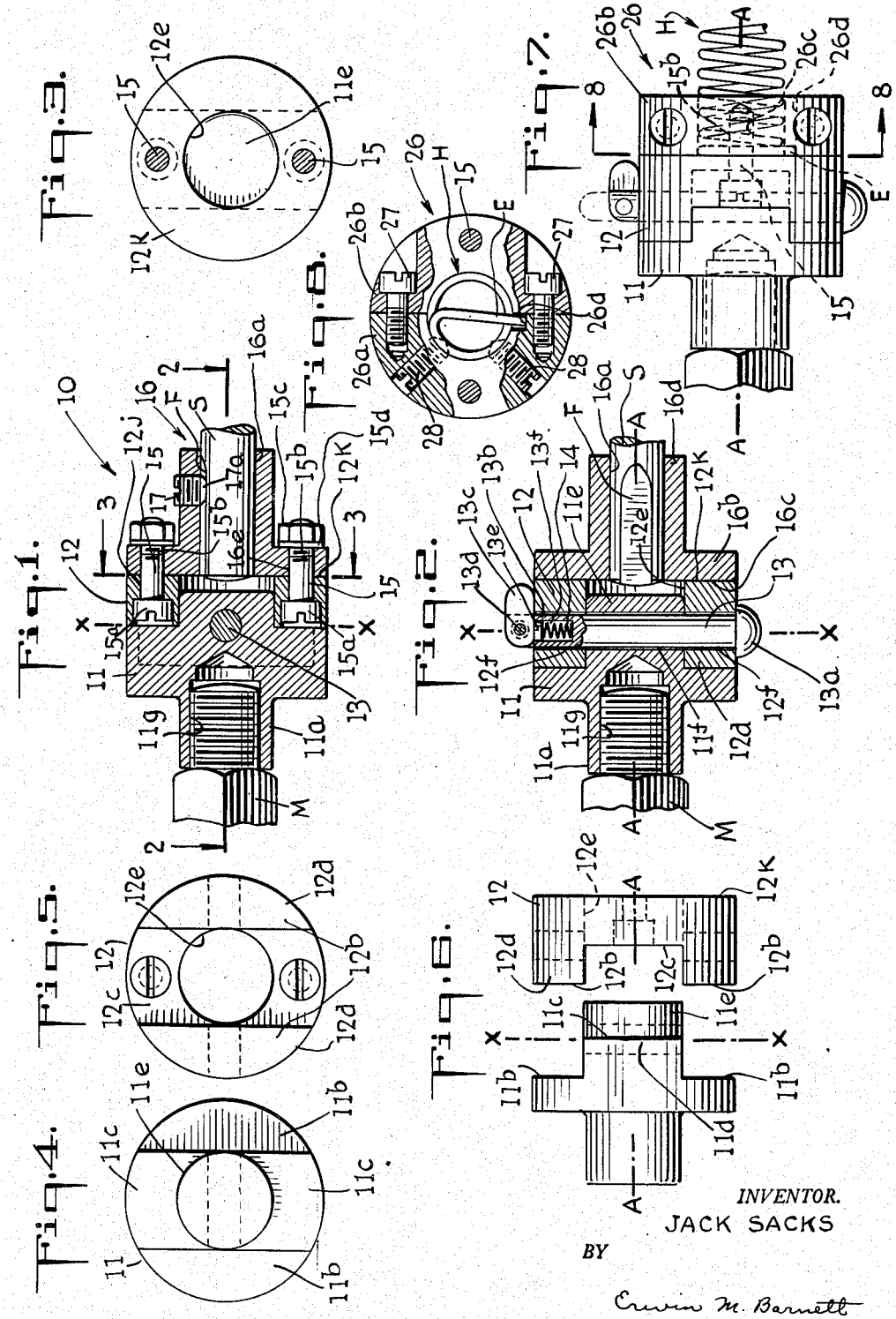
Nov. 11, 1952     J. SACKS     2,617,673
DETACHABLE COUPLING CONSTRUCTION
Filed July 2, 1949
INVENTOR.
JACK SACKS
BY
Erwin M. Barnett
ATTORNEY Patented Nov. 11, 1952

UNITED STATES PATENT OFFICE 2,617,673

DETACHABLE COUPLING CONSTRUCTION

Jack Sacks, Brooklyn, N. Y.

Application July 2, 1949, Serial No. 102,874

2 Claims. (Cl. 287—103)

This invention relates to extensible rotary pipe or conduit cleaning portable devices and more particularly to quick detachable coupling construction that may be interposed in an assembly of a sectionalizable pipe or conduit cleaning portable device to permit quick, easy and simple assembly for effective use, dismounting for transportation and compact storage, and ready interchanging of various parts of the sectionalized devices.

Among the objects of the invention is to generally improve coupling constructions of the character described which shall comprise few and simple parts that are readily incorporated in assemblies of sectionalizable pipe or conduit cleaning devices or the like, which shall permit interchanging of sections for different operational requirements of service of such devices, which shall be relatively cheap to manufacture, which shall be convenient and easy for quick assembly for effective use or dismounting for transportation and compact storage, which shall permit ready interchanging of the various parts of the sectionalized devices, and which shall be practical and efficient to a high degree in use.

This application is a continuation in part of application Ser. No. 102,873, filed on even date.

Other objects of this invention will in part be obvious and in part hereinafter pointed out.

The invention accordingly consists of features of constructions, combination of elements and arrangement of parts which will be exemplified in the constructions hereinafter described and of which the scope of the application will be indicated in the claims following.

In the accompanying drawing in which is shown various possible illustrative embodiments of the invention:

Fig. 1 is a sectional view taken centrally through an improved coupling construction embodying the invention for quick-detachably securing with a rotary power-drive shaft showing a cut taken perpendicular to an axis of the slide lock-pin.

Figs. 2 and 3 are cross-sectional views taken on line 2—2 and 3—3 in Fig. 1, respectively, Fig. 2 showing a cut taken in right angle relation to that shown in Fig. 1.

Figs. 4 and 5 are end elevational views of the male and female mating parts of the improved coupling shown in Figs. 1 and 2.

Fig. 6 is a front elevational view showing the male and female parts separated with the slide lock-pin removed.

Fig. 7 is a front elevational view of an intermediate assembled coupling construction embodying the invention for quick-detachably securing with a helically wound wire extension member.

Fig. 8 is a cross-sectional view taken on lines 8—8 in Fig. 7.

Referring in detail to the drawing, 10 denotes a coupling construction embodying the invention which may be interposed in an assembly or sectionalized pipe or conduit cleaning portable device to permit quick, easy and simple assembly for effective use, dismounting for transportation and compact storage, and to permit ready interchanging of various parts of sectionalized devices for convenient manipulation. For example, said coupling construction 10 may be interposed between an extension section rod member M, only a fragmentary portion being shown but which is fully described and shown in said copending application No. 102,873 and a rotary power drive shaft end S as shown in Figs. 1 and 2.

As seen from Figs. 1 to 6, said coupling construction 10 comprises male and female mating parts 11 and 12, respectively. Said male part 11 may be provided with integral axial extension 11a bored and tapped to provide an internal threaded portion 11g for connecting with a suitable driven power transmission means, such as said rod member M which screw connects with said threaded portion 11a as shown in Figs. 1 and 2.

Male mating part 11 has spaced apart segment surfaces 11b set back to lie in parallel relation to an intermediate plane X—X and has section surfaces 11c of a shouldered ledge 11d outstanding beyond said segment surfaces 11b, and a plug or stud 11e of circular cross section projects out centrally beyond said section surfaces 11c as is clear from Figs. 1, 2 and 7.

Female mating part 12 is formed structurally to interfit with said male mating part 11, that is, female part 12 has spaced apart ledges 12d having surfaces 12b conforming in size and shape and positioned to match up with male segment surfaces 11b when in assembled abutment therewith. Said female part ledge surfaces 12b in the assembly of coupling construction 10, project beyond and in parallel relation to plane X—X providing a recess therebetween, a section surface 12c of which normally lies in plane X—X in said assembly construction. Said section surfaces 12c conform in size, shape and position to match up with male section surfaces 11c of shoulder ledges 11d as is clear from Figs. 1 and 2. Female mating part 12 may also be formed with a central circular through-bore 12e sized to neatly have fitted therein plug or stud 11e for aligning the mating parts 11 and 12 on power driven transmission aligning on axis A—A.

For retaining the above described interfitted portion assembly against separation, a suitable lock-pin 13 is provided, which in the assembly has a longitudinal axis thereof lying in plane X—X and passes through holes 12f formed part way through ledges 12d which align with hole 11f formed part way through ledge 11d, said holes 12f and 11f providing a continuous passageway for said lock-pin 13, as shown in Figs. 1 and 2.

Lock-pin 13 may have a headed end 13a and suitable quick releasing latch means at the other or free end 13b. As shown in Figs. 2 and 6, said lock-pin latch means may comprise an extension finger lever 13c pivoted at 13d which is selectively held by a sliding plunger 13e in recess 13f under the action of compression spring 14 either in effective locking position, when lever 13c is as shown in full line in Figs. 2 and 7, or in a releasing position when lever 13c is as shown in dotted lines in Fig. 7. Said spring 14 then exerts pressure against the portion of lever 13c in alignment with pivot 13d.

For readily and quickly interchanging aligning drive-fittings for various service requirements of coupling construction 10, there may be provided as shown in Figs. 1 and 2, spaced apart, through-openings 12j parallelly extending through recess bottom surfaces 12c, each opening being countersunk from surfaces 12c to receive heads 15a of bolts 15 which are fitted into said openings 12j, said bolts 15 being radially spaced in parallel alignment with respect to said axis A—A as shown in Figs. 1 and 6.

Threaded ends 15b of bolts 15 opposite heads 15a, which extend beyond mounting surface 12k of female mating part 12, have screwed thereon anchoring units 15c against washers 15d, said bolt ends 15b being made of suitable length to extend through and beyond through-openings 16e of attachment fitting 16 which is rigidly secured by washers 15d, and units 15c in anchored position against mounting surface 12k.

As seen in Figs. 1 and 2, said attachment fitting 16 has an axially extending bore 16a and has a flange 16b pierced by through-openings 16e in alignment to receive bolt threaded ends 15b, said flange 16b being formed with a base surface 16c for abutting with said mounting surface 12k.

Since attachment fitting 16 may serve to align the coupling construction 10 with a suitable power drive, such as a motor shaft, only the rotary end shaft S being shown in Figs. 1 and 2, said fitting 16 may be made with a sleeve portion 16d integrally extending from said flange 16b about bore 16a for receiving shaft end S to neatly fit therethrough.

Suitable means for securing the coupling construction 10 to turn with said shaft end S may be provided, such as a case hardened or tempered set screw 17 threaded through fitting sleeve portion 16d having a cupped end 17a thereof bitingly engaging and gripping a flattened section F of shaft end S as shown in Fig. 1.

The utility of the improved coupling construction embodying the invention will now be apparent. After making and assembling the improved coupling 10 as described above and shown in Figs. 1 and 2, it may be made to serve as a quick detachably connecting means for transmitting power along axis A—A to the rod section end M of an assembly by screwing said rod section end M of an assembly into the threads 11g of male axial extension 11a.

Base surface 16c of attachment fitting 16 may be mounted against male mounting surface 12k with bolt threaded end 15b extending through and beyond fitting openings 16e, and anchored in position by firmly tightening washer 15d and anchoring units or nuts 15c for retaining the sleeve flange axial bore 16a in alignment with respect to axis A—A.

The power shaft end S may be secured in driving alignment in axial bore 16a by tightening set screw 17 to firmly seat the cupped end 17a thereof against shaft flattened section F.

To easily and quickly sectionalize the above described assembly of coupling construction 10, for requirements in readily interchanging of various parts or to extend or dismount the sections for transportation and compact storage, pin 13 may be removed by swinging finger lever 13c from the full line position shown in Figs. 1 and 2 to the dotted line position, and sliding said pin 13 out of its effective position to release the mating parts 11 and 12 for separation as is clear from Fig. 6.

To reassemble said mating coupling parts 11 and 12 they are interfitted and the pin 13 slidingly inserted, that is, male and female part ledges 11d and 12d, carrying projecting surfaces are interfitted in corresponding recesses formed with depressed surfaces which mate with said projecting surfaces in parallel planes with respect to central plane X—X thus positioning said ledges to extend across said central plane X—X, said pin 13 then releasably locking said parts 11 and 12 in place as shown in full lines in Figs. 1 and 2, and in the modified form of the invention hereinafter described as shown in Fig. 7.

Figs. 7 and 8 show a modified form of the invention in which coupling male and female parts 11 and 12, respectively are interfitted and releasably interlocked by lock pin 13, said male part 11 having axial extension 11a for detachable screw connection to rod section M, and said female part 12 having as fastening means, bolts 13, spaced apart and parallelly aligned with axis A—A all as shown in Figs. 1 to 6, and described above for coupling construction 10.

Where the invention is utilized to be interposed in an assembly of a sectionalized pipe or conduit cleaning portable device such as fully described in applicant's copending application Ser. No. 102,873, filed on even date herewith of which this application is a continuation in part, and where at least one section member H of such device is made of a helically wound wire, only an end of which is shown in Figs. 6 and 7, attachment fitting 26 may be used in the modified coupling assembly by replacing attachment fitting 16 described above.

Said attachment fitting 26 may comprise an annulus split across the diameter thereof into halves 26a and 26b which are releasably held together by a pair of spaced perimetric positioned screws 27.

Said halves 26a and 26b may be tapped with screw threads 26c positioned to receive threaded ends 15b of bolts 15 for aligning helically wound wire member H in said axis A—A, fitting half 26a being recessed, as at 26d, to receive terminal extension end stub E which prevents disconnection of the member H from fitting 26.

If desired, either or both of said halves 26a and 26b may be tapped to receive set-screws 28 to more positively secure said member H in proper alignment.

The above described modification of the invention may be used in the same manner as herein set forth for coupling construction 10 and may also serve as alignment guiding and bearing means when interposed in an assembly of a sectionalized portable device when inserted for cleaning a passageway of a pipe or conduit, the head 13a and lever 13c of lock-pin 13 serving as bearing surfaces against the interior wall of a passageway being cleaned.

It will thus be seen that there are provided coupling constructions whereby the several objects of this invention are achieved and which are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. In a coupling construction assembly of the character described, male and female parts having projected and depressed mating surfaces for abutting in a parallel plane with respect to a central plane, said female part having a ledge carrying said projected surfaces, said male part having a ledge formed with said depressed surfaces into which said projected surfaces are neatly interfitted, a slide lock-pin removably extending through said ledges lying substantially in said central plane for retaining said assembly effective for rotary power transmission with respect to a predetermined axis, an integrally formed plug extension outstanding from the ledge of said male part of a width corresponding to the width of said ledge, said ledge of the female part being formed with a through-opening into which said plug neatly fits for aligning the mating parts in said axis, said male part having an integrally formed aligning screw attachment means at the end opposite said plug, said female part having a mounting surface disposed perpendicularly to said axis and having openings extending in parallel spaced relation to said axis, said openings each being countersunk on an end thereof spaced from said mounting surface, and anchoring bolts fitted into said openings to extend beyond said mounting surface with heads of said bolts seated in said countersunk ends for securing an attachment fitting aligned with said axis.

2. A coupling construction assembly of the character described comprising male and female parts having projected and depressed mating surfaces for abutting in a parallel plane with respect to a central plane, said parts having ledges carrying said projected surfaces and recesses formed with said depressed surfaces into which said projected surfaces are neatly interfitted, a slide lock-pin removably positioned to extend through said ledges lying substantially in said central plane for retaining said assembly effective for rotary power transmission with respect to a predetermined axis, a mounting surface for said female part disposed perpendicularly to said axis, and a detachable connection fitting mounted in axial alignment on said surface to turn with said female part, said detachable connection fitting being an annulus split into half portions releasably secured together, said annulus having an internal diameter for neatly receiving an end of a helically coiled wire section member, the peripheral rim of said internal diameter being recessed for engaging therein a projecting end stub of said member.

JACK SACKS.

REFERENCES CITED

The following references are of record in the file of this patent:

UNITED STATES PATENTS

| Number | Name | Date |
| --- | --- | --- |
| 297,153 | Muir | Apr. 22, 1884 |
| 523,506 | Barnes | July 24, 1894 |
| 1,109,836 | Hanson | Sept. 8, 1914 |
| 1,166,835 | Hogan | Jan. 4, 1916 |
| 2,489,536 | Nelson | Nov. 29, 1949 |